Sept. 15, 1925.
V. V. SOBENNIKOFF
1,554,138
METHOD AND APPARATUS FOR EXTRACTING GASES FROM LIQUIDS
Filed March 28, 1925
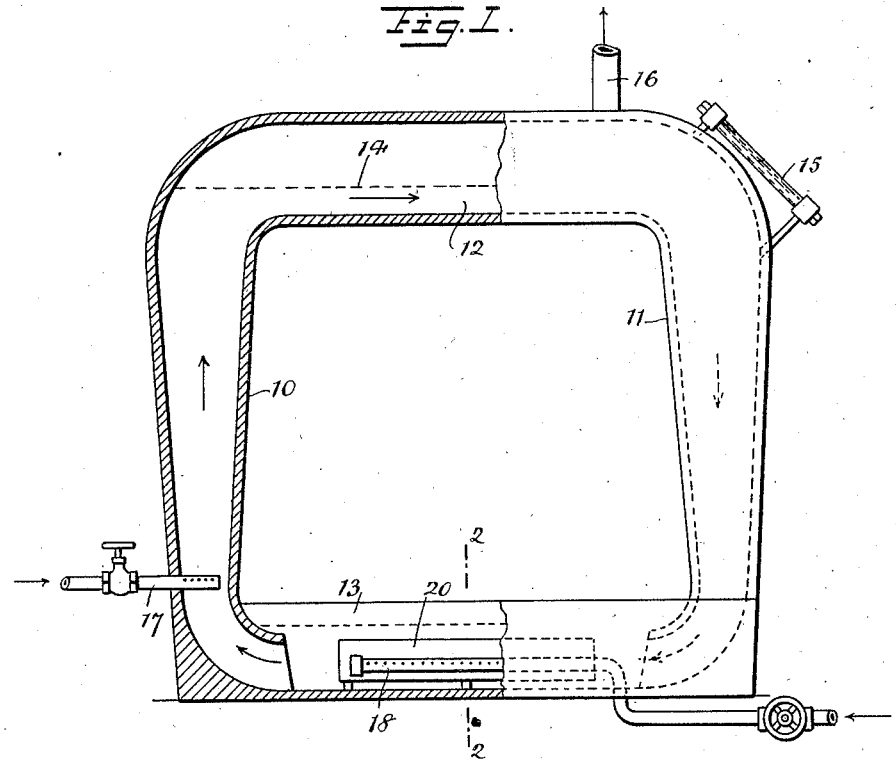
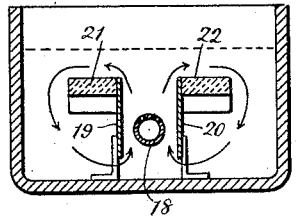
WITNESSES
INVENTOR
V. V. Sobennikoff
BY
ATTORNEYS Patented Sept. 15, 1925.

1,554,138

UNITED STATES PATENT OFFICE.

VADIM V. SOBENNIKOFF, OF NEW YORK, N. Y.

METHOD AND APPARATUS FOR EXTRACTING GASES FROM LIQUIDS.

Application filed March 28, 1925. Serial No. 19,124.

*To all whom it may concern:*

Be it known that I, VADIM V. SOBENNIKOFF, a citizen of Russia, and a resident of the city of New York, borough of Manhattan, in the county and State of New York, have invented a new and Improved Method and Apparatus for Extracting Gases from Liquids, of which the following is a full, clear, and exact description.

This invention relates to a method and apparatus for extracting gases from liquids.

An object of the invention is to provide a simple and efficient method and operation whereby gases can be efficiently and quickly removed from liquids, preferably as they are circulating through the apparatus.

Another object concerns the provision of a simple and efficient apparatus whereby the above-mentioned object can be achieved in an economical manner with an apparatus which is simple and durable.

The invention is illustrated in the drawings, of which—

Figure 1 is a side elevation of the apparatus shown partly in section; and

Figure 2 is a section on the line 2—2 of Fig. 1.

The form of the invention shown in the drawings is a preferred form, although it is understood that modifications in the construction and arrangement of the parts and in the character of the materials used may be adopted without departing from the spirit of the invention as set forth in the appended claims.

In its general aspect, the invention comprises the provision of a method which involves circulating a liquid containing a gas through a suitable airtight chamber and subjecting the liquid within the chamber and above the surface thereof to the effect of a vacuum, which will, of course, draw the gas therefrom very readily. This method preferably involves subjecting the liquid to such a vacuum while it is in circulation through the apparatus.

This method further contemplates the provision of means whereby a given body of liquid can be, at one point in its travel, aerated or gasified, and then can be degasified later on in the same cycle of operation, this procedure taking place in a more or less continuous manner.

In the preferred form of the invention I preferably provide a U-shaped chamber having vertical limbs 10 and 11 and a horizontally connecting portion 12. The lower ends of these limbs 10 and 11 are open to dip beneath an open top portion 13 which may be formed integrally with the chamber or not, as the case may be. The apparatus is filled with liquid to the level indicated by the numeral 14. The apparatus is provided with a water gauge 15 and a gas discharge pipe 16 which may be connected to a suitable vacuum apparatus, At the lower portion of one of the legs, preferably 10, of the chamber I introduce a gas supply pipe 17. Preferably I dispose in the bottom of the trough a perforated pipe 18. This is disposed between baffle plates 19 and 20. These baffles act as supports for porous plates 21 and 22 which aid in the gasification of the liquid passing through the trough. The circulation of a liquid in the trough under the influence of the gas released from pipe 18 is indicated by the arrows in Fig. 2. The flow of liquid in the main chamber is shown by arrows in Fig. 1.

In the operation of the device, liquid is introduced into the chamber until the desired level 14 is reached. At this time gas is introduced through the pipe 17 and the bubbles of gas rising will naturally tend to raise the level of the liquid at the upper left side of the receptacle, causing a circulation as indicated by the arrows. As the gasified liquid passes across the top of the vessel, the gas is withdrawn by reason of the suction applied to pipe 16. The degasified liquid descends in the right-hand leg 11 of the vessel, enters the portion 13, and by reason of the circulation thus established will pass along the pipe 18 and in contact with the plates 21 and 22. If it is desired in accordance with one application of the apparatus, to charge the liquid again with gas, it will be charged in this location by reason of its contact with the pipe 18 and the plates 21 and 22.

It is to be noted, however, that the lower ends of the legs 10 and 11 can, if desired, be connected to separate, independent pipes, so that the liquid after being degasified can be run off to any desired location without being circulated again through the apparatus.

In other words, the apparatus can be used in accordance with one method or the other, depending upon whether it is desired to continuously circulate the liquid through the same apparatus in a repeated cycle of movements or whether it is to be drawn off after having once been degasified.

What I claim is:—

1. An apparatus for removing gas from liquids, which comprises an inverted U-shaped chamber, a suction pipe connected to the top of the chamber above the level of liquid therein, and a gas-introducing pipe disclosed in one limb of the chamber near the bottom thereof.

2. An apparatus for removing gas from liquid, which comprises an inverted U-shaped airtight chamber, a trough into which the lower ends of the limbs of said chamber depend, means in said trough for introducing gas into the liquid passing therethrough, and means for creating a circulation of air through the apparatus.

3. An apparatus for removing gas from liquid, which comprises an inverted U-shaped airtight chamber, a trough into which the lower ends of the limbs of said chamber depend, means in said trough for introducing gas into the liquid passing therethrough, and means in one of said limbs for creating a circulation of water through the apparatus.

VADIM V. SOBENNIKOFF.